US011047455B2

(12) United States Patent
Lebender et al.

(10) Patent No.: US 11,047,455 B2
(45) Date of Patent: Jun. 29, 2021

(54) BELT-TENSIONING DEVICE

(71) Applicant: Kleemann GmbH, Göppingen (DE)

(72) Inventors: Frank Lebender, Gruibingen (DE); Daniel Andreas, Leipzig (DE); Vjekoslav Belosevic, Göppingen (DE); Tobias Köhler, Eislingen (DE); Karl Füller, Hohenstadt (DE); Otto Blessing, Bartholomä (DE)

(73) Assignee: Kleemann GmbH

( * ) Notice: Subject to any disclaimer, the term of this patent is extended or adjusted under 35 U.S.C. 154(b) by 427 days.

(21) Appl. No.: 16/068,391

(22) PCT Filed: Dec. 21, 2016

(86) PCT No.: PCT/EP2016/082157
§ 371 (c)(1),
(2) Date: Jul. 6, 2018

(87) PCT Pub. No.: WO2017/121594
PCT Pub. Date: Jul. 20, 2017

(65) Prior Publication Data
US 2019/0024763 A1    Jan. 24, 2019

(30) Foreign Application Priority Data

Jan. 13, 2016 (DE) .................. 10 2016 100 509.6

(51) Int. Cl.
*F16H 7/12* (2006.01)
*F16H 7/08* (2006.01)
*B02C 2/00* (2006.01)

(52) U.S. Cl.
CPC ......... *F16H 7/1272* (2013.01); *F16H 7/0848* (2013.01); *F16H 7/1263* (2013.01);
(Continued)

(58) Field of Classification Search
CPC ............... F16H 7/08; F16H 2007/0802; F16H 2007/0863; F16H 2007/0865;
(Continued)

(56) References Cited

U.S. PATENT DOCUMENTS 691,538 A * 1/1902 Frigerio .................... F16H 7/02
474/87
3,602,054 A * 8/1971 Monteith .............. F16H 7/1236
474/109
(Continued)

FOREIGN PATENT DOCUMENTS

DE         174480 C      9/1906
DE         614688 C      6/1935
(Continued)

OTHER PUBLICATIONS

DE614688C Translation; Renold & Coventry Chain Co LTD; Published: Jun. 15, 1935; Espacenet/ EPO (Year: 1935).*
(Continued)

*Primary Examiner* — Michael R Mansen
*Assistant Examiner* — Raveen J Dias
(74) *Attorney, Agent, or Firm* — Lucian Wayne Beavers; Patterson Intellectual Property Law, PC

(57) ABSTRACT

A belt tensioning device for a crusher or a screening machine for tensioning at least one circulating drive belt which is deflected about a belt pulley of a drive and has a load strand and an empty strand. The drive can be driven with a crushing assembly, a screening unit, a generator, or the like of the crusher by the drive belt. The vibrational stress acting on the machine chassis can be significantly reduced in that the belt tensioning device has two tensioning rollers each of which is rotatably mounted on a holder of a tensioning part. One tensioning roller is paired with the empty strand and the other is paired with the load strand. Additionally, the two
(Continued)

Figure 1:
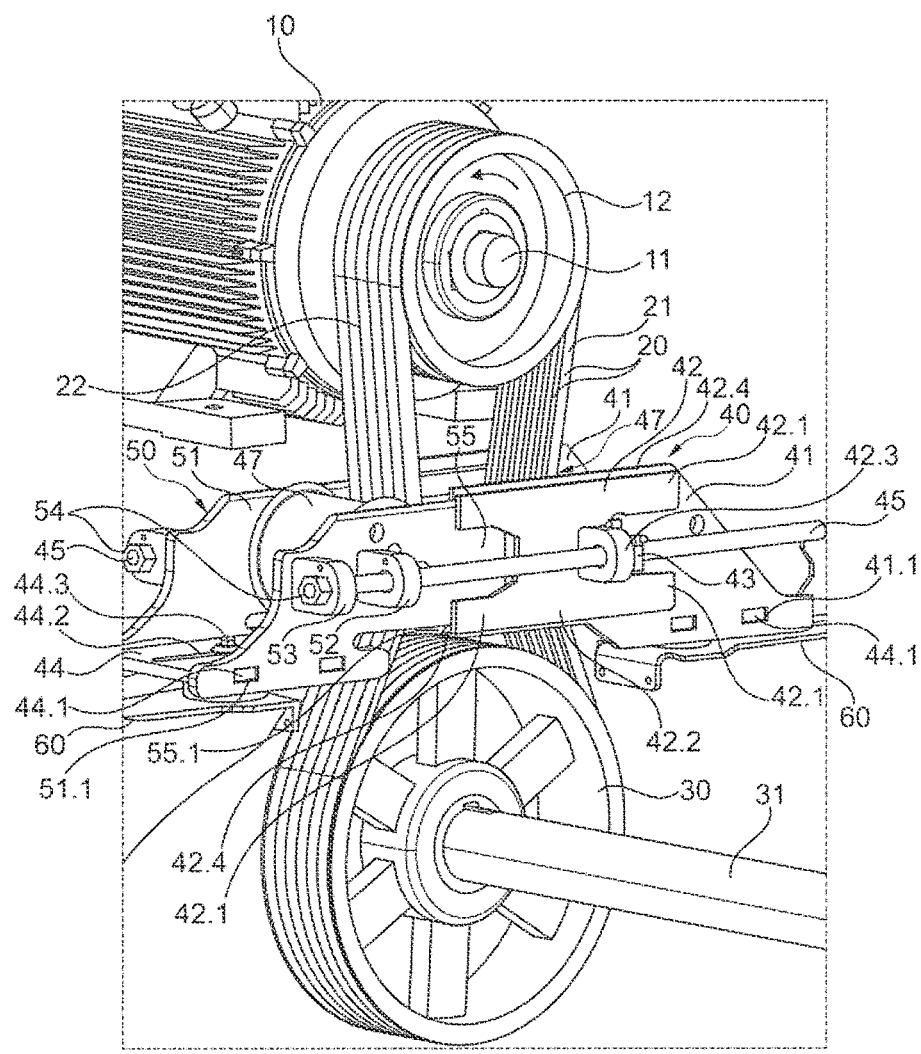

tensioning parts can be adjusted relative to each other between an open position and a tensioning position, in which the tensioning parts are held against each other at least opposite the tensioning direction. In particular the tensioning parts can be blocked against each other, and the complete closed system can be freely moved linearly using adjustment guides according to the load situation.

17 Claims, 4 Drawing Sheets

(52) U.S. Cl.
CPC .......... *B02C 2/00* (2013.01); *F16H 2007/088* (2013.01); *F16H 2007/0857* (2013.01); *F16H 2007/0865* (2013.01); *F16H 2007/0874* (2013.01); *F16H 2007/0891* (2013.01); *F16H 2007/0897* (2013.01)

(58) Field of Classification Search
CPC ..... F16H 2007/0874; F16H 2007/0876; F16H 2007/088; F16H 2007/0891; F16H 2007/0895; F16H 2007/0893; F16H 2007/0857; F16H 7/12; F16H 7/0848; F16H 7/1272; F16H 7/1263
USPC .................................. 474/111, 134, 137, 138
See application file for complete search history.

(56) References Cited

U.S. PATENT DOCUMENTS

| | | | | |
|---|---|---|---|---|
| 3,630,096 A | * | 12/1971 | Brewer | F16H 7/1263 |
| | | | | 474/132 |
| 4,662,862 A | * | 5/1987 | Matson | F16H 7/08 |
| | | | | 474/101 |
| 5,758,760 A | | 6/1998 | Vergeer et al. | |
| 5,938,551 A | | 8/1999 | Warner | |
| 6,068,567 A | * | 5/2000 | Thompson | F16H 7/08 |
| | | | | 474/101 |
| 6,117,034 A | * | 9/2000 | Vine | F16H 7/1263 |
| | | | | 474/134 |
| 2002/0039943 A1 | | 4/2002 | Serkh | |
| 2004/0087401 A1 | * | 5/2004 | Serkh | F16H 7/1218 |
| | | | | 474/134 |
| 2013/0277175 A1 | | 10/2013 | Campbell et al. | |
| 2019/0120344 A1 | * | 4/2019 | Kim | F16H 7/1263 |

FOREIGN PATENT DOCUMENTS

| | | | | |
|---|---|---|---|---|
| DE | 3209966 A1 | | 9/1983 | |
| DE | 69505732 D1 | | 12/1998 | |
| DE | 202017005337 U1 | * | 10/2018 | ............... F16H 7/12 |
| JP | 2010266010 A | | 11/2010 | |
| WO | 03040592 A1 | | 5/2003 | |

OTHER PUBLICATIONS

International search report from corresponding PCT/EP2016/082157 (not prior art).
Office action dated Sep. 21, 2018 in corresponding German application Serial No. 10 2016 100 509.6 (not prior art).

\* cited by examiner

BELT-TENSIONING DEVICE

The invention relates to a belt tensioning device for a rock crusher, a screening plant or the like for tensioning at least one revolving drive belt, which latter is deflected about a belt pulley of a drive and has a load strand and an empty strand, wherein, by means of the drive belt, the drive can be driven with a crushing assembly, a screening unit, a generator or the like of the rock crusher.

Rock crushers possess a drive motor, for instance an internal combustion engine or an electric motor. This drives, via a belt system, a crushing assembly, for instance a conical crushing assembly. In order to deliver the necessary tension to the drive belt, or to acquire the tension, a belt tensioner is used. This usually comprises a tension roller, which is supported by a tensioning arm. The tensioning arm is coupled via a tensioning system to the machine chassis of the rock crusher. During operational use, the crushing assembly produces vibrations. These are transmitted into the drive belt. As a result, the belt tensioning device is also set vibrating. In this way, forces and vibrations are introduced into the machine chassis. On the one hand this is undesirable for reasons of comfort, on the other hand this sometimes leads to considerable component stresses. The same applies, with similar effects, to screening machines, or in respect of the driving of generators or pumps, in particular in rock crushers or screening plants.

The object of the invention is to provide a belt tensioning device of the type mentioned in the introduction, with which the vibration load on the connected machine chassis is significantly reduced and with which, despite the occurring vibrations and the occurring wear, a compulsory belt tension is ensured.

This object is achieved in that the belt tensioning device has two tension rollers, which are respectively rotatably mounted on a holder of a tensioning part, wherein one tension roller is assigned to the empty strand and the other to the load strand, and in that the two tensioning parts are mutually adjustable between an opening position and a tensioning position and, in the tensioning position, at least counter to the direction of tensioning, are supported one against the other, in particular are mutually blockable.

With the tension rollers and the two tensioning parts, a self-contained force transmission system is formed. Thus, the tension rollers are supported one against the other via the tensioning parts. In the tensioning state, the two tension rollers deliver a pretension both to the load strand and to the empty strand, in that they act on the back of the belt. This has the advantage that the angle of wrap of the belt pulleys associated with the load strand and the empty strand increases. In this way, higher drive torques are able to be transmitted, or, given the same drive power, a simpler drive belt can economically be used. It is also conceivable, in so-called multibelt systems, to reduce the number of drive belts.

In the arrangement according to the invention, it is additionally of advantage that the total tension is distributed among the two tension rollers, which leads to simpler components. Furthermore, the necessary total tensioning path is distributed among the two tension rollers. The bending of the drive belt in the region of the tension rollers is thereby reduced in relation to a one-roller system. This results in a longer working life of the drive belt. The belt tensioning device according to the invention can readily be used in systems in which the direction of running of the drive belt, or the direction of load with the same direction of running, can vary.

According to a preferred design variant of the invention, it can be provided that the two tensioning parts respectively have an actuating element, by means of which they are adjustable in and opposite to the direction of tensioning. In this way, the tensioning parts can compensate the oscillation of the drive belt due to the operational vibrations without the machine body being subjected to excessive load. Vibrations which are introduced into the belt tensioning device can thus be compensated in the direction of the machine body.

It can here advantageously be provided that the actuating element is formed by a slot, which extends in the direction of tensioning. Via the slot as the actuating element, a cost-effective solution is able to be presented. If a holder is adjustable on a counterstay, in particular two-dimensionally in one plane, then the oscillation can be compensated particularly effectively.

A particularly stable construction can be achieved in that the tensioning parts respectively have holders on both sides of the tension rollers, in that on the holders are held tensioning pieces, which connect the holders, and in that to the tensioning pieces are assigned fixing elements.

Alternatively it can be provided that the tensioning parts respectively have a holder, that on the holders is held a tensioning piece, which connects the holders, that the tensioning piece is fed through between two revolving drive belts, and that to the tensioning piece is assigned a fixing element. A space-saving construction is hereby obtained.

A simple adjustment facility is then offered for the tensioning parts if it is provided that the fixing element(s) are adjustable on the tensioning piece(s) in order to mutually adjust the holders in the direction of tensioning. A continuous adjustment can be achieved in that the tensioning pieces have threads on which the fixing element, configured as a nut, is adjustable.

A conceivable invention alternative can be characterized in that the two tensioning parts are coupled to each other by means of a linear guide. In this case, the tensioning parts are securely connected to each other via the linear guide. This function can be realized with a small number of parts in that one of the tensioning parts bears a guide element, and in that the guide element forms a sliding guide, which cooperates with a sliding guide of the other tensioning part.

It is herein also conceivable that the guide element is fixedly connected to the tensioning part or is integrally molded onto the latter, that angled off from the guide element are two sliding guides, which overlap those edges of the second tensioning part which lie opposite the sliding guides, for the formation of the linear guide. In this case, the tensioning parts are supported securely one against the other. Thus high forces can be transmitted between the tensioning parts.

If it is provided that both tensioning parts respectively have a guide element, then a symmetrical force distribution is possible.

A particularly preferred variant of the invention provides that a damping element is assigned to one or both tensioning parts in order to support the tensioning part relative to a machine body. In this way, any residual vibrations which are present can be damped, which reduces the load on the machine body.

One conceivable variant of the invention is such that the tensioning parts have mutually spaced holders, between which the tension rollers are arranged, and that the tension rollers are fastened to both holders. As a result, the tension rollers are securely mounted with a small number of parts. The number of parts can be further reduced in that the tensioning parts have structurally identical holders, on which the tension rollers are held, and/or in that the holders of a tensioning part are connected to each other by means of a connecting element, wherein the connecting element preferably has the actuating element for the linear adjustment of the tensioning part.

Particularly preferably, it is provided that the holders of a tensioning part are connected to each other by means of a connecting element, wherein the connecting element preferably has the actuating element for the linear adjustment of the tensioning part. A stable construction is hereby obtained.

According to a further variant of the invention, it can be provided that the belt tensioning device has a resiliently elastic element, which is configured and arranged such that the tension rollers can yield in a resiliently elastic manner with respect to each other counter to the pretensioning direction. With this measure, a loss of pretension, for instance in consequence of the lengthening of a drive belt, can be compensated. Particularly preferably, the resiliently elastic element is disposed in the force flow region between the two tensioning parts. It can act, in particular, in the region of the tensioning pieces.

Figure 2:
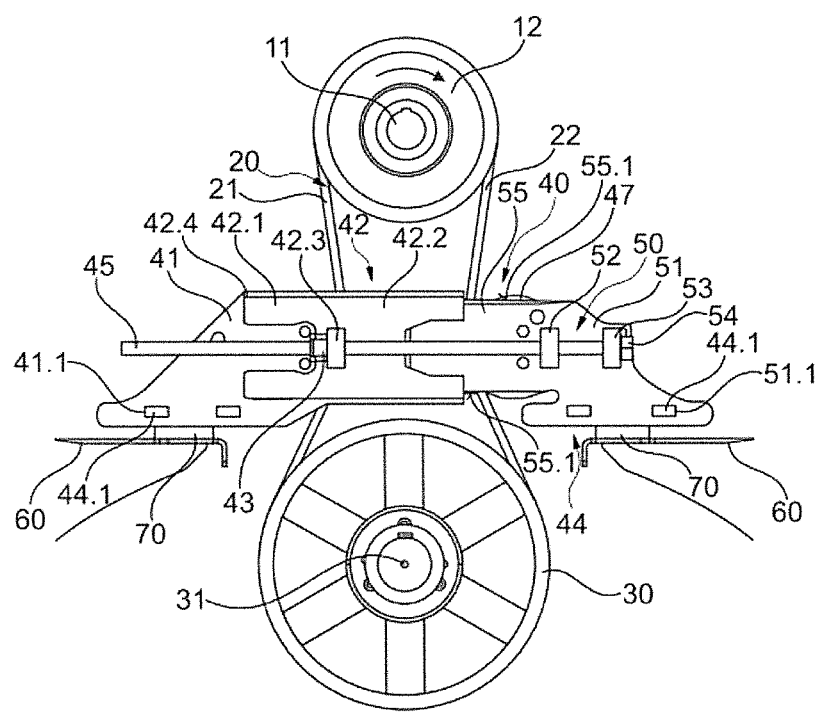
Figure 3:
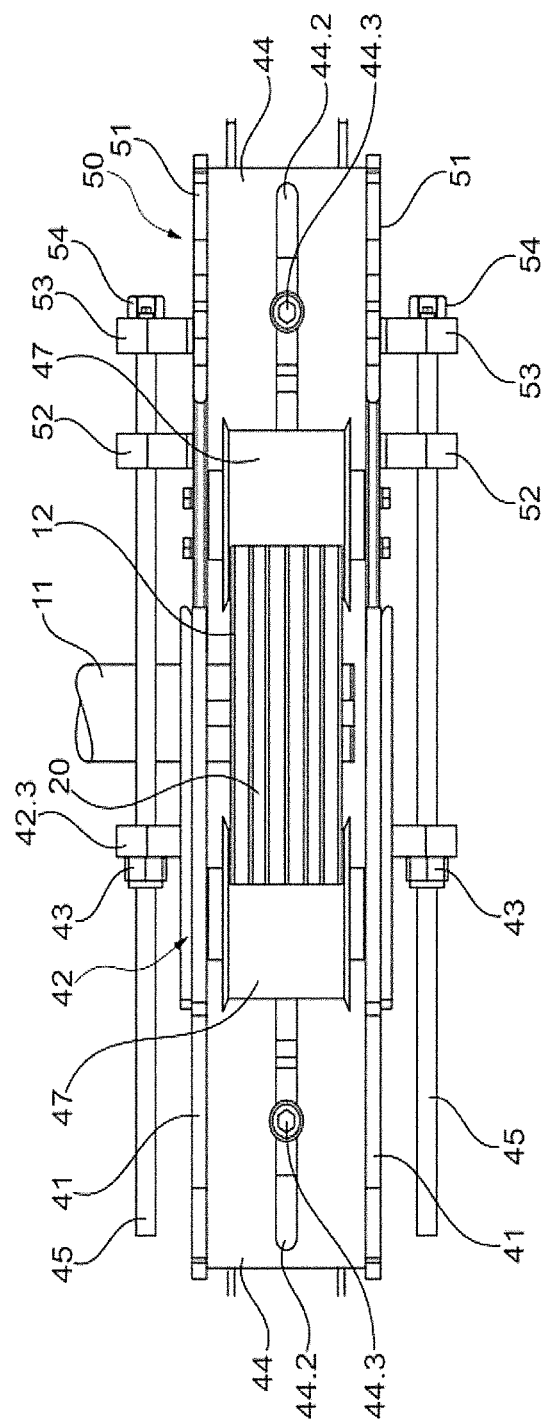
Figure 4:
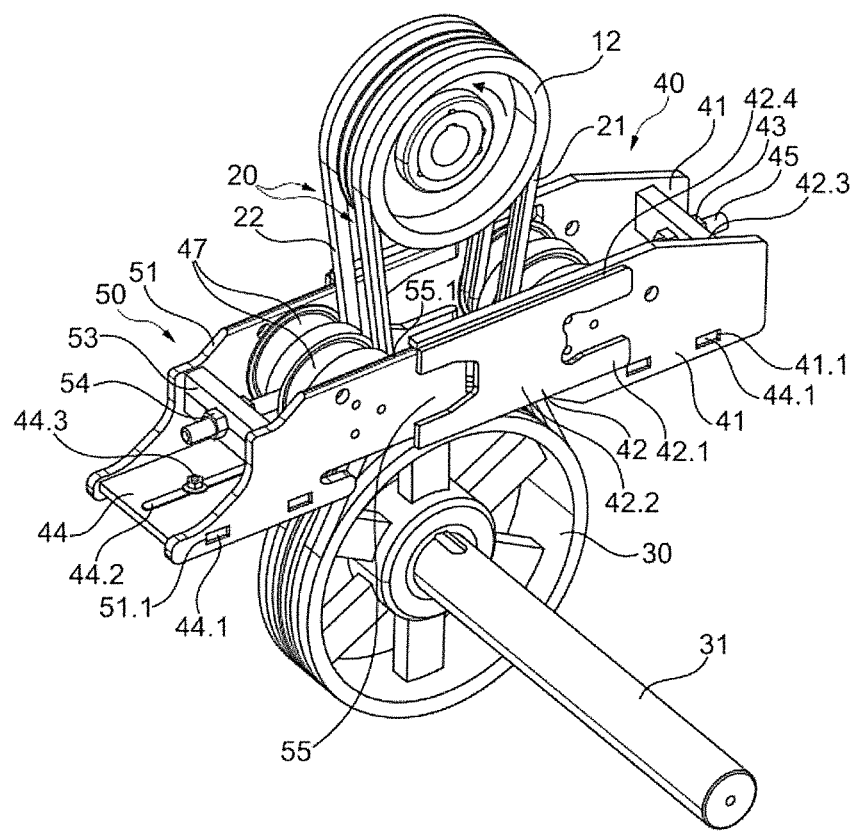

The invention is explained in greater detail below with reference to illustrative embodiments represented in the drawings, wherein:

FIG. 1: shows a belt tensioning device in perspective representation,

FIG. 2: shows the belt tensioning device according to FIG. 1 in a view from the front, FIG. 3: shows the belt tensioning device according to FIGS. 1 and 2 in a view from above, FIG. 4: shows in perspective representation a further design variant of a belt tensioning device.

FIG. 1 shows a belt tensioning device for a rock crusher, in particular a cone crusher. Here, a drive 10, which in the present case is configured as an electric motor, is used. The electric motor is typically powered by a generator, which, in turn, is driven by the internal combustion engine of the rock crusher. Alternatively, a direct drive by means of a switchable clutch is also conceivable. Fixed in a non-rotatable manner on the drive shaft 11 of the drive 10 is a belt pulley 12. The belt tensioning device further comprises a second belt pulley 30, which is coupled in a rotationally secure manner to a drive shaft 31. The drive shaft 31 leads to the crushing assembly of the rock crusher. The two belt pulleys 12 and 30 are coupled to each other by means of a drive belt 20. In the present case, a multiplicity of individual drive belts 20, which are respectively wrapped around the two belt pulleys 12 and 30, are used. Between the two belt pulleys 12 and 30 is arranged the belt tensioning device. The belt tensioning device here comprises two tension rollers 47. One tension roller 47 acts on the load strand 21, and the other tension roller 47 on the empty strand 22 of the drive belts 20. The tension rollers 47 have a cylindrical surface, which at the end is closed off on both sides with circumferential beads. The tension rollers 47 act on the rear side of the drive belts 20.

As can be seen from FIG. 1, the tension rollers 47 are respectively held on tensioning parts 40, 50 of the belt tensioning device. The tensioning part 40 possesses two holders 41. These can, in particular, be of plate-like construction. The holders 41 are coupled to each other via a connecting element 44. The connecting element 44 possesses lateral projections 44.1 and is likewise of plate-like configuration. The projections 44.1 are positioned in receptacles 41.1 of the holders 41. In this way, the two holders 41 are held at a distance apart and are exactly aligned relative to each other. The connecting element 44 can be connected, for instance welded, to the holders 41. To the holder 41 is additionally fastened a guide element 42. The guide element 42 possesses a base part 42.2, onto which lugs 42.1 are molded. In the region of the base part 42.2, a bearing piece 42.3 is fastened to the guide element 42. The bearing piece 42.3 possesses a feedthrough. Through this can be fed a tensioning piece 45. The tensioning piece 45 is in the present case configured as a threaded rod. The tensioning piece 45 can be axially fixed on the bearing piece 42.3 in one direction by means of a fixing element 43. For instance, the fixing element 43 can be configured as a nut. The tensioning piece 45 configured as a threaded rod, and the fixing element 43 configured as a nut, may be referred to together as a threaded tensioning rod and fastening nut assembly. On the two opposite upper and lower edges, the guide element 42 has sliding guides 42.4. The sliding guides 42.4 are in the present case configured in a simple manner as angular offsets and are angled off in the direction of the drive belts 20.

The second tensioning part 50 has, just like the first tensioning part 40, two holders 51. These are again connected to each other by means of a connecting element 44. Here too, the connecting element 44 has projections 44.1, which are positioned in receptacles 51.1 of the holders 51. The connecting element 44 is connected, for instance welded, to the holders 51. Preferably, the holders 51 of the tensioning part 50 are identical with the holders 41 of the tensioning part 40, so that a reduced number of parts is obtained. Fixed on the holders 51 are bearing pieces 52. The two bearing pieces 52 have guides. Through these guides are fed the two tensioning pieces 45. Furthermore, additional bearing pieces 53 are fastened on the holders 51. The tensioning pieces 45 are fed through receptacles of these bearing pieces 53. They can be fixed to the bearing pieces 53 by means of fixing elements 54, which in the present case can be configured as nuts. Hence the design is thus chosen such that the fixing element 54 axially blocks the displacement of the tensioning piece 45 in one direction. The fixing element 43 blocks the displacement in the other direction.

FIG. 1 further reveals that in the region of the connecting elements 44 is provided an actuating element 44.2. The actuating element 44.2 may also be referred to as an adjustment guide. The actuating element 44.2 is here configured as a slot. It extends, in the image plane according to FIG. 2, in the horizontal direction from left to right. In the present belt tensioning device, both tensioning parts 40, 50 are equipped with actuating elements 44.2. In this way, the belt tensioning device can be adjusted by means of the actuating elements 44.2, in the image plane according to FIG. 2, from left to right, and vice versa. FIG. 1 shows that in the region of machine-side brackets 60 is arranged a damping element 70. The damping element supports the tensioning parts 40, 50 relative to the brackets 60, so that a vibration damping can be achieved. In the present illustrative embodiment, the damping elements 70 are supported relative to the bottom side of the connecting elements 44. The damping elements 70 possess integrated fastening elements 44.3, which are fed through the actuating elements 44.2. With the actuating elements 44.2 and the fastening elements 44.3, there is here created a type of linear guide, which enables a linear adjustment of the tensioning parts 40, 50. The fastening elements 44.3 prevent, however, an adjustment of the tensioning parts 40, 50 perpendicular to the plane of the connecting elements 44.

As is further shown by FIG. 1, the tensioning part 50 possesses on its holders 51 a sliding guide 55. As is shown in the present case, the sliding guide 55 can be formed by the opposite edges 55.1 of the holders 51.

For the installation of the shown belt tensioning device, the tensioning parts 40, 50 are placed with their tension rollers 47 respectively against the load strand and empty strand of the drive belts 20. The tensioning part 50 is here inserted with its sliding guide 55 into the sliding guide 42.4 of the tensioning part 40. In the present case, the edges 55.1 of the holders 51 thus slide along the angled-off sliding guides 42.4 of the guide element 42. The tensioning piece 45 can now be passed through the bearing pieces 42.3, 52 and 53. As can be seen from the drawings, on both sides of the belt tensioning device preferably identical tensioning pieces 45 are here used. The fixing elements 43 and 54 can then be screwed onto the tensioning pieces 45. In the opposite-sense bracing of the fixing elements 54, the tension rollers 47 are moved closer together. They thus tension the drive belts 20 in the manner shown in FIGS. 1 and 2 respectively. The fixing elements 43 and 45 are designed with self-locking, so that, also during operational use, no adjustment of the tensioning parts 40, 50 is obtained. It is also conceivable that the fixing elements 43, 45 are secured in the installation position by means of a blocking element. In this way, the fixing elements 54 can, for instance, be respectively welded to the tensioning pieces 45. The fixing element 43, which serves for the adjustment, can be secured to the bearing piece 43 by means of a detachable blocking piece, for instance by means of an angled-off plate.

During operational use, the drive belts 20 rotate, wherein in FIGS. 1 and 2 the direction of rotation is indicated with an arrow. The drive belts 20 here revolve around the belt pulleys 12 and 30. The tension rollers 47 act on the rear side of the drive belts 20 and thus tension both the load strand and the empty strand. If now, during operational use, vibrations are transmitted from the crushing assembly via the drive shaft 31, then these vibrations are transmitted also into the drive belts 20, and from these into the belt tensioning device. A transmission of these vibrations into the machine chassis can be compensated with the belt tensioning device according to the invention. In particular, the displacements of the tensioning parts 40 and 50 on the actuating elements 44.2 enables a compensation of these preferably oscillating movements. In the direction of running of the drive belts 20, only small forces are transmitted, which forces are absorbed with the fastening elements 44.3. In other words, the fixing elements 44.3 have merely to hold the belt tensioning device in position. Any vibrations which are here generated are damped, moreover, with the damping elements 70.

With the belt tensioning device according to the invention, the rotational direction can also readily be reversed. In this case, the load strand and empty strand 21, 22 merely switch.

In FIG. 4, a further design variant of the invention is represented. The belt tensioning device which is shown there has substantially a similar structure to the belt tensioning device according to FIGS. 1-3, so that only the differences need to be discussed below. The belt tensioning device again has two tensioning parts 40, 50. The tensioning parts 40, 50 possess two holders 41 and 51. The holders 41, 51 are kept distanced apart in parallel and connected to each other by means of connecting elements 44. In addition, between the holders 41 and 51, bearing pieces 53, 42.3 are provided. The bearing pieces 53 and 42.3 have feedthroughs. Through these feedthroughs can be pushed a tensioning piece 45 in the form of a threaded rod. As can be seen from FIG. 4, the tensioning piece 45 is guided in the region between the holders 41 and 51. On the belt pulleys 12, 30, the drive belts are applied in pairs. Between the pairs is created a free space, through which the tensioning piece 45 is passed. The belt tensioning device comprises four tension rollers 47. These are again built onto the holders 41 and 51, wherein on each holder 41, 51 is respectively mounted a tension roller 47. As can be seen from FIG. 4, the tensioning piece 45 is fed through between the tension rollers 47.

For the installation of the belt tensioning device, the two tensioning parts 40, 50, as in the belt tensioning device according to FIGS. 1-3, are inserted one into the other. The tension rollers 47 here come to lie on the backs of the drive belts 20. The tensioning piece 45 can be placed through the aligned apertures in the bearing pieces 42.3 and 53. By means of the fixing elements 43 and 54, the tensioning parts 40, 50 can be braced one against the other. The drive belts too are then tensioned by means of the tension rollers 47.

Just as in the belt tensioning device according to FIGS. 1-3, in the belt tensioning device according to FIG. 4 a symmetrical bracing of the tensioning parts 40, 50 is achieved in order to apply an even tensioning pressure to the drive belts 20. Due to the centric bracing according to FIG. 4, a lower construction volume of the belt tensioning device can be achieved.

A refinement of the invention can provide a flexible element. This is disposed, in particular, in the force flow region between the two tension rollers 47. The flexible element is here designed and arranged such that the two tension rollers 47 can yield with respect to each other counter to the pretensioning direction. It is conceivable that, as the flexible element, a spring is used. This can be integrated, for instance as a cup spring or other spring, in the region of at least one tensioning piece 45. Particularly preferably, the spring element is inserted in the region between the tensioning piece 45 and a fixing element 54. Of course, it is also possible, where a plurality of tensioning pieces 45 are used, to assign to each tensioning piece 45 an elastic element.

The belt tensioning device according to the invention can be used for a rock crusher or a screening machine for tensioning at least one revolving drive belt 20. The drive belt 20 is here deflected about a belt pulley 12 of a drive 10 and has a load strand and an empty strand 21, 22, wherein, by means of the drive belt 20, the drive 10 can be driven with a crushing assembly, a screening unit, a generator or the like of the rock crusher.

According to the invention, the belt tensioning device has two tension rollers 47, which are respectively rotatably mounted on a holder 41, 51 of a tensioning part 40, 50, wherein one tension roller 47 is assigned to the empty strand 22 and the other to the load strand 21. The two tensioning parts (40, 50) are mutually adjustable between an opening position and a tensioning position and, in the tensioning position, at least counter to the direction of tensioning, are supported one against the other, in particular are mutually blockable.

With such an arrangement, particular usage advantages are obtained. Thus, in particular, a bilateral tensioning of the drive belts is possible. This results in an increase in the angle of wrap. As a result, the necessary number of drive belts is able to be reduced, and/or the belt quality can be reduced, and/or a reduction of the belt pretensioning force becomes possible. In addition, the invention also offers the possibility of reversing the rotational direction. In this sense, the empty strand and the load strand can be switched.

The arrangement according to the invention offers, in particular, the possibility of a "floatingly mounted arrangement". This means that the tension rollers are supported one against the other and only low forces are transmitted into the machine chassis during operational use. As a result, a reduction of vibration transmissions into the machine chassis is achieved. In addition, a tension-loss-free reaction of the tensioning unit to a change in load states of the crusher assembly (compensation of peaks, for example as a result of uncrushable material or transition from no-load operation to load operation or starting-up/braking of the crushing assembly, etc.), can be achieved, for instance.

The invention claimed is:

1. A belt tensioning device for tensioning at least one revolving drive belt about a belt pulley of a drive, the at least one revolving drive belt having a load strand and an empty strand, the belt tensioning device comprising:
    a first tensioning part including a first holder;
    a second tensioning part including a second holder;
    a first tension roller mounted on the first holder;
    a second tension roller mounted on the second holder, the first and second tension rollers being configured to each engage a respective one of the strands of the at least one revolving drive belt;
    one of the first and second tensioning parts including two opposite edges defined on its respective holder; and
    a guide element connected to the other of the first and second tensioning parts, the guide element including two sliding guides angled off from the guide element and overlapping the two opposite edges, so that the two sliding guides and the two opposite edges form a linear guide between the first and second tensioning parts so that the first and second tensioning parts are mutually adjustable in a direction of tensioning between an opening position and a tensioning position;
    wherein:
    the first tensioning part includes two of the first holders spaced apart from one another and a first connecting element connecting the first holders;
    the second tensioning part includes two of the second holders spaced apart from one another and a second connecting element connecting the second holders; and
    at least one of the first and second connecting elements has an adjustment guide defined therein to allow for linear adjustment of a position of the respective first and second tensioning part.

2. The belt tensioning device of claim 1, wherein:
    the first and second tensioning parts each include one of the adjustment guides configured to allow adjustment of the position of the first and second tensioning parts relative to one another in the direction of tensioning.

3. The belt tensioning device of claim 2, wherein:
    each adjustment guide includes a slot extending parallel to the direction of tensioning.

4. The belt tensioning device of claim 1, further comprising:
    at least one damping element connected to at least one of the first and second tensioning parts and configured to support the at least one of the first and second tensioning parts relative to a machine body on which the belt tensioning device is to be mounted.

5. The belt tensioning device of claim 1, wherein:
    the first and second holders are structurally identical to one another.

6. The belt tensioning device of claim 1, further comprising:
    first and second vibration damping elements configured to support the first and second tensioning parts, respectively.

7. A belt tensioning device for tensioning at least one revolving drive belt about a belt pulley of a drive, the at least one revolving drive belt having a load strand and an empty strand, the belt tensioning device comprising:
    a first tensioning part including a first holder;
    a second tensioning part including a second holder;
    a first tension roller mounted on the first holder;
    a second tension roller mounted on the second holder, the first and second tension rollers being configured to each engage a respective one of the strands of the at least one revolving drive belt;
    one of the first and second tensioning parts including two opposite edges defined on its respective holder; and
    a guide element connected to the other of the first and second tensioning parts, the guide element including two sliding guides angled off from the guide element and overlapping the two opposite edges, so that the two sliding guides and the two opposite edges form a linear guide between the first and second tensioning parts so that the first and second tensioning parts are mutually adjustable in a direction of tensioning between an opening position and a tensioning position;
    wherein:
    the first tensioning part includes two of the first holders located on opposite sides of the first tension roller;
    the second tensioning part includes two of the second holders located on opposite sides of the second tension roller; and
    the belt tensioning device further includes:
    a first tensioning piece connecting the first holder and second holder on one side of the first and second tension rollers;
    a second tensioning piece connecting the first holder and second holder on the opposite side of the first and second tension rollers from the first tensioning piece;
    a first fixing element configured to hold the first and second tensioning parts in place relative to the first tensioning piece; and
    a second fixing element configured to hold the first and second tensioning parts in place relative to the second tension piece.

8. The belt tensioning device of claim 7, wherein:
    the first and second fixing elements are adjustably positioned on the first and second tensioning pieces to adjust a relative position between the first and second tensioning parts in the direction of tensioning.

9. The belt tensioning device of claim 8, wherein:
    the first and second tensioning pieces each include threads; and
    the first and second fixing elements each include a nut adjustably positioned on the threads of the first and second tensioning pieces, respectively.

10. A belt tensioning device for tensioning at least one revolving drive belt about a belt pulley of a drive, the at least one revolving drive belt having a load strand and an empty strand, the belt tensioning device comprising:
    a first tensioning part including a first holder;
    a second tensioning part including a second holder;
    a first tension roller mounted on the first holder;
    a second tension roller mounted on the second holder, the first and second tension rollers being configured to each engage a respective one of the strands of the at least one revolving drive belt;
    one of the first and second tensioning parts including two opposite edges defined on its respective holder; and
    a guide element connected to the other of the first and second tensioning parts, the guide element including two sliding guides angled off from the guide element and overlapping the two opposite edges, so that the two sliding guides and the two opposite edges form a linear guide between the first and second tensioning parts so that the first and second tensioning parts are mutually adjustable in a direction of tensioning between an opening position and a tensioning position;
wherein:
the first tensioning part includes two of the first holders located on opposite sides of the first tension roller;
the second tensioning part includes two of the second holders located on opposite sides of the second tension roller; and
the belt tensioning device further includes:
a tensioning piece centrally located between the two first holders and between the two second holders, the tensioning piece being configured to be fed through between two revolving drive belts; and
a fixing element configured to hold the first and second tensioning parts in place relative to the tensioning piece.

11. The belt tensioning device of claim 10, wherein:
the fixing element is adjustably positioned on the tensioning piece to adjust a relative position between the first and second tensioning parts in the direction of tensioning.

12. The belt tensioning device of claim 11, wherein:
the tensioning piece includes a thread; and
the fixing element includes a nut adjustably positioned on the thread of the tensioning piece.

13. A belt tensioning device for tensioning at least one revolving drive belt about a belt pulley of a drive, the at least one revolving drive belt having a load strand and an empty strand, the belt tensioning device comprising:
a first tensioning part including a first holder;
a second tensioning part including a second holder;
a first tension roller mounted on the first holder;
a second tension roller mounted on the second holder, the first and second tension rollers being configured to each engage a respective one of the strands of the at least one revolving drive belt;
one of the first and second tensioning parts including two opposite edges defined on its respective holder; and
a guide element connected to the other of the first and second tensioning parts, the guide element including two sliding guides angled off from the guide element and overlapping the two opposite edges, so that the two sliding guides and the two opposite edges form a linear guide between the first and second tensioning parts so that the first and second tensioning parts are mutually adjustable in a direction of tensioning between an opening position and a tensioning position;
wherein:
the first tensioning part includes two of the first holders spaced apart from one another;
the second tensioning part includes two of the second holders spaced apart from one another;
the first tension roller is connected to both of the first holders; and
the second tension roller is connected to both of the second holders.

14. A belt tensioning device for tensioning at least one revolving drive belt about a belt pulley of a drive, the at least one revolving drive belt having a load strand and an empty strand, the belt tensioning device comprising:
a first tensioning part including a first holder;
a second tensioning part including a second holder;
a first tension roller mounted on the first holder;
a second tension roller mounted on the second holder, the first and second tension rollers being configured to each engage a respective one of the strands of the at least one revolving drive belt;
one of the first and second tensioning parts including two opposite edges defined on its respective holder;
a guide element connected to the other of the first and second tensioning parts, the guide element including two sliding guides angled off from the guide element and overlapping the two opposite edges, so that the two sliding guides and the two opposite edges form a linear guide between the first and second tensioning parts; and
at least one threaded tensioning rod and fastening nut assembly connected between the first and second tensioning parts, so that the first and second tensioning parts are mutually adjustable in a direction of tensioning between an opening position and a tensioning position and so that the first and second tensioning parts are supportable against one another through the at least one threaded tensioning rod and fastening nut assembly;
wherein:
the first tensioning part includes two of the first holders located on opposite sides of the first tension roller;
the second tensioning part includes two of the second holders located on opposite sides of the second tension roller; and
the at least one threaded tensioning rod and fastening nut assembly includes a first threaded tensioning rod and fastening nut assembly connecting the first holder and second holder on one side of the first and second tension rollers and a second threaded tensioning rod and fastening nut assembly connecting the first holder and second holder on the opposite side of the first and second tension rollers from the first threaded tensioning rod and fastening nut assembly.

15. The belt tensioning device of claim 14, further comprising:
first and second vibration damping elements configured to support the first and second tensioning parts, respectively.

16. A belt tensioning device for tensioning at least one revolving drive belt about a belt pulley of a drive, the at least one revolving drive belt having a load strand and an empty strand, the belt tensioning device comprising:
a first tensioning part including a first holder;
a second tensioning part including a second holder;
a first tension roller mounted on the first holder;
a second tension roller mounted on the second holder, the first and second tension rollers being configured to each engage a respective one of the strands of the at least one revolving drive belt;
one of the first and second tensioning parts including two opposite edges defined on its respective holder;
a guide element connected to the other of the first and second tensioning parts, the guide element including two sliding guides angled off from the guide element and overlapping the two opposite edges, so that the two sliding guides and the two opposite edges form a linear guide between the first and second tensioning parts; and
at least one threaded tensioning rod and fastening nut assembly connected between the first and second tensioning parts, so that the first and second tensioning parts are mutually adjustable in a direction of tensioning between an opening position and a tensioning position and so that the first and second tensioning parts are supportable against one another through the at least one threaded tensioning rod and fastening nut assembly;

wherein:

the first tensioning part includes two of the first holders located on opposite sides of the first tension roller;

the second tensioning part includes two of the second holders located on opposite sides of the second tension roller; and the at least one threaded tensioning rod and fastening nut assembly is centrally located between the two first holders and between the two second holders, the at least one threaded tensioning rod and fastening nut assembly being configured to be fed through between two revolving drive belts.

17. A belt tensioning device for tensioning at least one revolving drive belt about a belt pulley of a drive, the at least one revolving drive belt having a load strand and an empty strand, the belt tensioning device comprising:

a first tensioning part including a first holder;

a second tensioning part including a second holder;

a first tension roller mounted on the first holder;

a second tension roller mounted on the second holder, the first and second tension rollers being configured to each engage a respective one of the strands of the at least one revolving drive belt;

one of the first and second tensioning parts including two opposite edges defined on its respective holder;

a guide element connected to the other of the first and second tensioning parts, the guide element including two sliding guides angled off from the guide element and overlapping the two opposite edges, so that the two sliding guides and the two opposite edges form a linear guide between the first and second tensioning parts; and at least one threaded tensioning rod and fastening nut assembly connected between the first and second tensioning parts, so that the first and second tensioning parts are mutually adjustable in a direction of tensioning between an opening position and a tensioning position and so that the first and second tensioning parts are supportable against one another through the at least one threaded tensioning rod and fastening nut assembly;

wherein:

the first tensioning part includes two of the first holders spaced apart from one another and a first connecting element connecting the first holders;

the second tensioning part includes two of the second holders spaced apart from one another and a second connecting element connecting the second holders; and at least one of the first and second connecting elements has an adjustment slot defined therein and extending in the direction of tensioning to allow for linear adjustment of a position of the respective first and second tensioning part.

* * * * *